United States Patent [19]

Ono et al.

[11] Patent Number: 5,512,523
[45] Date of Patent: Apr. 30, 1996

[54] MONOLITHIC REFRACTORY POWDER MIXTURE

[75] Inventors: Yasushi Ono; Satoshi Sakamoto, both of Takasago; Yutaka Murata, Kobe; Tetsuo Kaji, Takasago; Yasuhiko Endo, Tokyo, all of Japan

[73] Assignee: Asahi Glass Company Ltd., Tokyo, Japan

[21] Appl. No.: 372,835

[22] Filed: Jan. 13, 1995

Related U.S. Application Data

[63] Continuation of Ser. No. 187,485, Jan. 28, 1994, abandoned.

[30] Foreign Application Priority Data

Feb. 3, 1993 [JP] Japan .................... 5-039425

[51] Int. Cl.$^6$ ....................................... C04B 35/66
[52] U.S. Cl. ........................... 501/127; 501/89; 501/96; 501/124; 501/128; 106/692; 106/693
[58] Field of Search ................. 501/96, 97, 89, 501/124, 127, 128; 106/692, 693

[56] References Cited

U.S. PATENT DOCUMENTS

| | | | |
|---|---|---|---|
| 4,495,301 | 1/1985 | Sutor | 501/127 X |
| 4,583,581 | 4/1986 | Ferguson et al. | |
| 4,680,279 | 7/1987 | Kleeb | 501/124 |
| 4,751,204 | 6/1988 | Kyoden et al. | 501/89 |
| 4,874,726 | 10/1989 | Kleeb et al. | 501/128 X |
| 4,943,544 | 7/1990 | McGarry et al. | 106/692 X |
| 5,246,897 | 9/1993 | Ono et al. | |
| 5,252,526 | 10/1993 | Whittmore | 501/127 |

FOREIGN PATENT DOCUMENTS

| | | |
|---|---|---|
| 0437324 | 7/1991 | European Pat. Off. . |
| 62-17056 | 1/1987 | Japan . |
| 62-221434 | 9/1987 | Japan . |
| 63-45161 | 2/1988 | Japan . |
| 2192439 | 7/1990 | Japan . |
| 2311338 | 12/1990 | Japan . |
| 32009 | 1/1991 | Japan . |
| 3115176 | 5/1991 | Japan . |
| 3164454 | 7/1991 | Japan . |
| 3208851 | 9/1991 | Japan . |
| 4170353 | 6/1992 | Japan . |
| 2176773 | 1/1987 | United Kingdom . |

OTHER PUBLICATIONS

Chemical Abstracts, vol. 117, No. 20, 16 Nov. 1992, Columbus, Ohio, US; Abstract No. 197106, Toritani & Al. 'Castable Refractories Containing Spherical Silicon Carbide Particles for Flowability, Slag Resistance and Low Porosity.' "Abstract" & JP-A-4 164 868 (Kawasaki Refractories Co. Ltd) 10 Jun. 1992.

Chemical Abstracts, vol. 115, No. 16, 21 Oct. 1991, Columbus, Ohio, US; Abstract No. 165026, Matsuo & Al. 'Castable Refractories for Injection.' *Abstract* & JP-A-3 115 176 (Harima Ceramic Co. Ltd) 16 May 1991.

American Ceramic Society Bulletin, vol. 62, No. 9, Sep. 1983, pp. 1004–1009, Pickles & McLean 'Production of Fused Refractory Oxide Spheres and Ultrafine Oxide Particles in an Extended Arc' *Abstract* pp. 1005, 1006: 'Experimental'.

Database WPI, Section CH, Week 8306, Derwent Publications Ltd., London, GB; Class 102, AN 83–13243K & JP-A-57 209 890 (Nippon Plybrico KK) 23 Dec. 1982 *Abstract*.

Cement-Concrete, No. 538, Dec. 1991, pp. 1–7.

*Primary Examiner*—Karl Group
*Attorney, Agent, or Firm*—Oblon, Spivak, McClelland, Maier & Neustadt

[57] ABSTRACT

A monolithic refractory powder mixture containing from 2 to 3 wt % of spheroidized refractory particles having a mean particle size of at most 30 μm of at least one member selected from the group consisting of alumina cement, alumina, titania, bauxite, diaspore, mullite, aluminous shale, chamotte, pyrophyllite, sillimanite, andrewsite, silica rock, chromite, spinel, magnesia, zirconia, zircon, chromia, silicon nitride, aluminum nitride, silicon carbide, boron carbide, zirconium boride and titanium boride, and having a cone flow value of at least 180 mm when a refractory mixture having the powder mixture kneaded by an addition of 6 parts by weight of water per 100 parts by weight of the powder mixture, is cast into a cone-shaped mold with a dimension of 70 mmø–100 mmø×60 mm and left to stand for 60 seconds without exerting vibration after removing the cone-shaped mold.

11 Claims, 1 Drawing Sheet

MONOLITHIC REFRACTORY POWDER MIXTURE

This application is a Continuation of application Ser. No. 08/187,485, filed on Jan. 28, 1994, now abandoned.

The present invention relates to a monolithic refractory powder mixture having excellent flowability, which makes man power saving at the application operation site possible.

As compared with shaped refractories, monolithic refractories usually have a merit such that they require less man power in both their production and their application operation, and they are energy saving, although they may have a drawback that the bulk density is small, and their service life is rather short. Recently, monolithic refractory powder mixtures having excellent dispersibility i.e. flowability and capable of providing cast products having a high bulk density with a reduced amount of water incorporated, have been developed, whereby the service life has been improved. Therefore, when the cost performance is taken into consideration, monolithic refractories are generally more advantageous than shaped refractories.

Thus, monolithic refractories have gradually been used in place of conventional shaped refractories, and their demand is increasing year by year. Further, some of monolithic refractories developed to further man power saving, which have sufficient flowability that makes pumping possible, have been practically used.

However, monolithic refractories having sufficient flowability to permit their pumping still require a considerably large amount of water as compared with monolithic refractories commonly used for casting operation. Thus, they have a problem that with such a large amount of incorporated water, the resulting refractory cast product tends to have a low bulk density and poor in the service life.

On the other hand, in the field of concrete materials for building and construction work using portland cement mainly, a concrete material excellent in the flowability, which makes pumping possible, has been proposed in e.g. Japanese Unexamined Patent Publications No. 192439/1990, No. 208851/1991, No. 164454/1991, No. 170353/1992 and No. 311338/1992, and it has been disclosed that incorporation of spheroidized portland cement particles is effective for improvement of the flowability of the concrete material.

Further, Japanese Unexamined Patent Publication Mo. 221434/1987 proposes to conduct spheroidizing treatment of solid particles by mechanical impact treatment in a high speed air stream, and discloses that spheroidizing treatment of portland cement to be used for concrete has been tried by this spheroidizing treatment method.

And Japanese Examined Patent Publication No. 2009/1991 proposes modification of solid particles by coating with fine powder particles by a mechanical impact treatment in a high speed air stream.

It is an object of the present invention to solve the above mentioned problems inherent to conventional monolithic refractories and to provide a monolithic refractory powder mixture of which refractory mixture has a sufficient flowability to permit its pumping and which can be applied without exerting vibration, whereby it is possible to obtain a cast product having a bulk density comparable with the bulk density of conventional monolithic refractories formed by casting under vibration.

The present invention has been made to accomplish the above object and provides a monolithic refractory powder mixture containing from 2 to 30 wt % of spheroidized refractory particles having a mean particle size of at most 30 µm of at least one member selected from the group consisting of alumina cement, alumina, titania, bauxite, diaspore, mullite, aluminous shale, chamotte, pyrophyllite, sillimanite, andrewsite, silica rock, chromite, spinel, magnesia, zirconia, zircon, chromia, silicon nitride, aluminum nitride, silicon carbide, boron carbide, zirconium boride and titanium boride, and having a cone flow value of at least 180 mm when a refractory mixture having the powder mixture kneaded by an addition of 6 parts by weight of water per 100 parts by weight of the powder mixture, is cast into a cone-shaped mold (truncated) with a dimension of 70 mmø–100 mmø×60 mm and left to stand for 60 seconds without exerting vibration after removing the cone-shaped mold.

The present inventors have found it possible to remarkably improve the flowability of a monolithic refractory mixture comprising various types of refractory aggregates as main constituents, by incorporating from 2 to 30 wt % of spheroidized refractory particles having a mean particle size of at most 30 µm into the monolithic refractory powder mixture, and have succeeded in providing a monolithic refractory powder mixture which is a powder mixture comprising various types of refractory aggregates as main constituents and which provides self-flowability when kneaded by an addition of a relatively small amount of water, such that it naturally flows without exerting vibration, and internal bubbles will naturally surface and be discharged from the surface to provide a cast product having a high bulk density.

Figure 1:
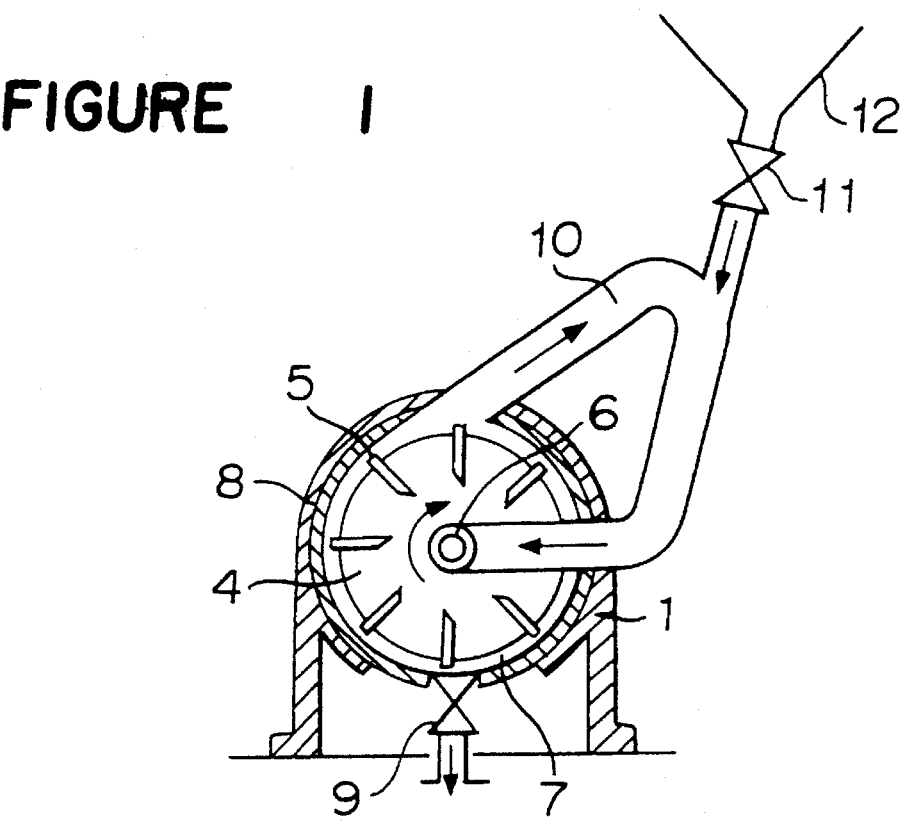
FIG. 1 is a cross-sectional front view illustrating an apparatus useful for spheroidizing treatment of refractory particles to be incorporated to the monolithic refractory powder mixture of the present invention.

Now, the present invention will be described in detail with reference to the preferred embodiments.

The spheroidized refractory particles to be incorporated to the monolithic refractory powder mixture may be of any material so long as they are made of at least one member selected from the group consisting of alumina cement, alumina, titania, bauxite, diaspore, mullite, aluminous shale, chamotte, pyrophyllite, sillimanite, andrewsite, silica rock, chromite, spinel, magnesia, zirconia, zircon, chromia, silicon nitride, aluminum nitride, silicon carbide, boron carbide, zirconium boride and titanium boride.

The spheroidized refractory particles have a mean particle size of at most 30 µm. If the mean particle size is larger than 30 µm, the effects for improving the dispersibility by incorporating such spheroidized refractory particles to the powder mixture tend to be low, and when the mean particle size is at most 30 µm, the amount of the spheroidized refractory particles to be incorporated may be small, whereby the cost required for spheroidizing treatment of refractory particles may be small. The spheroidized refractory particles may have a wide particle size distribution. Their mean particle size is preferably from 1 to 20 µm.

In the present invention, the mean particle size is the particle size at the position where the integrated weight is 50 wt % in the integrated particle size distribution of the refractory particles obtained by a particle size distribution analyser by laser diffraction.

When the mean particle size of the spheroidized refractory particles to be incorporated to the powder mixture is at most 30 µm, preferably when the particle sizes of at least 90 wt % of the spheroidized refractory particles are at most 30 µm, it is possible to obtain an effect of remarkably improving the flowability of the monolithic refractory mixture having water added and kneaded thereto, by incorporating the spheroidized refractory particles in an amount of at least 2 wt %, preferably at least 3 wt %, of the powder mixture. The reason for such an excellent effect is considered to be such that the spheroidized refractory particles efficiently fill out spaces among refractory aggregates as main constituents of the powder mixture and thus lubricate to increase the flowability of the monolithic refractory mixture having water added and kneaded thereto.

If the amount of the spheroidized refractory particles having a mean particle size of at most 30 μm exceeds 30 wt % of the powder mixture, the amount of dense refractory aggregates which can be incorporated to the powder mixture, will correspondingly decrease, whereby the flowability of the refractory mixture having the powder mixture kneaded by adding water will be low. In view of the cost and labor required for spheroidizing treatment of refractory particles, it adds to the cost of the powder mixture to incorporate a large amount of spheroidized refractory particles to the powder mixture. Therefore, the amount of the spheroidized refractory particles to be incorporated is at most 30 wt %, preferably at most 20 wt %.

In the present invention, the cone flow value is measured by a slightly modified version of the method stipulated in JIS R-5201. If the cone flow value is at least 180 mm when a refractory mixture having the monolithic refractory powder mixture kneaded by adding water, is cast into a cone-shaped mold with a dimension of 70 mmø–100 mmø×60 mm and left to stand for 60 seconds without exerting vibration after removing the cone-shaped mold, such a monolithic refractory powder mixture has sufficient self-flowability that makes the operation by pumping possible. With the monolithic refractory powder mixture of the present invention, it is possible to obtain a refractory mixture having a cone flow value of at least 180 mm when water is added and kneaded in a relatively small amount of 6 parts by weight per 100 parts by weight of the powder mixture. When the cone flow value is at least 190 mm, more preferably at least 200 mm, pumping of the refractory mixture will be easier, and surfacing of air bubbles in the refractory mixture will be facilitated, whereby a cast product having a higher bulk density can be obtained. As another numerical value representing flowability of a refractory mixture, a slump flow value may sometimes be used, which is a flow value obtained without exerting vibration by using a cone-shaped mold (truncated) with a dimension of 100 mmø–200 mmø× 300 mm as prescribed in JIS A-1101. The two flow values do not have a simple proportional relationship to each other. However, cone flow values of 180 mm, 200 mm and 220 mm in the present invention roughly correspond to slump flow values of 500 mm, 550 mm and 600 mm, respectively.

Thus, with the monolithic refractory powder mixture of the present invention, the operation by pumping may be made possible when water is added and kneaded thereto in an amount equal to or even smaller than the amount required for conventional monolithic refractories for casting under vibration. Further, it has self-flowability, whereby the refractory mixture will be fully filled to the corners of the mold frame even without exerting vibration which used to be required, and air bubbles will naturally be discharged from the interior of the refractory mixture. Accordingly, the bulk density of the resulting cast product which is influential over the service life, will be comparable to the bulk density of cast products of conventional monolithic refractories formed by casting under vibration. Further, if the amount of water is further reduced, and the operation is carried out under vibration, it is possible to further reduce the porosity and to obtain a cast product having a higher bulk density.

A preferred monolithic refractory powder mixture of the present invention contains from 0.5 to 10 wt % of spheroidized alumina cement particles having a mean particle size of at most 30 μm. When alumina cement is from 0.5 wt % to less than 2 wt %, the powder mixture necessarily contains at most 1.5 wt % of other spheroidized refractory particles. Alumina cement particles have a wide particle size distribution. For example, in the case of alumina cement particles having an average particle size of 5.5. μm, it has a wide particle size distribution ranging from 0.3 to 176 μm, but the majority is particles having particle sizes of at most 30 μm. Such alumina cement may be spheroidized as it is and may be incorporated to the powder mixture.

If alumina cement is incorporated to the powder mixture in an amount of more than 10 wt %, even if it is spheroidized alumina cement, no further improvement will be obtained in the resulting refractory cast product, and refractoriness rather tends to decrease. Therefore, the amount of high alumina cement is preferably at most 10 wt %.

Spheroidizing treatment of the refractory particles can be conducted by introducing a powder of refractory particles into a common pulverizer provided with rotary blades. In such a case, fine refractory particles having particle sizes of at most 30 μm will be discharged from the pulverizer substantially without being crushed. Sharp angles of refractory particles will be rounded off, whereby the particle sizes of the refractory particles will be reduced a little corresponding to the rounding off of the angles. Fine particles resulting from the rounding off of the angles of the refractory particles, or fine particles separately added, may fix to the surface of the refractory particles or may fill dents on the surface of the refractory particles to facilitate the spheroidizing.

In another preferred monolithic refractory powder mixture of the present invention, fine particles of at least one member selected from the group consisting of metal oxides, metal nitrides, metal carbides and metal borides having a mean particle size of at most 50% of the mean particle size of the refractory particles and made of a material different from the refractory particles, are attached to the surface of the spheroidized refractory particles.

Preferred fine particles of metal oxides to be attached to the surface of the refractory particles, include, silica, alumina, mullite, spinel, zirconia, zircon, chromia, titania and clay. Likewise, the metal nitrides include, silicon nitride and aluminum nitride; the metal carbides include, silicon carbide and boron carbide; and the metal borides include, titanium boride and zirconium boride and boron nitride.

It is possible to impart a hydrophilic nature to the refractory particles and thus improve the dispersibility of the refractory particles by adding fine particles of a material different from the refractory particles at the time of the spheroidizing treatment of the refractory particles. Further, in a case where non-oxide particles such as graphite particles are incorporated in the powder mixture, it is thereby possible to prevent oxidation of such non-oxide particles and thus to further improve the performance of the resulting monolithic refractories.

Such fine particles will cover spheroidized refractory particles such as alumina cement particles, as attached on theirssurface. Therefore, their mean particle size is preferably at most 50%, more preferably at most 30%, of the mean particle size of the refractory particles.

The fine particles attached to the surface of the refractory particles will modify the nature of the surface of the refractory particles. For example, if the refractory particles are covered with fine hydrophilic particles having a large absolute value of minus δ-potential, it is possible to improve the dispersibility of the monolithic refractory powder mixture when the refractory particles are put into water, or the flowability of the kneaded refractory mixture.

Another preferred monolithic refractory powder mixture of the present invention contains spheroidized alumina refractory particles in addition to alumina cement particles. Without subjecting alumina cement particles to spheroidizing treatment, the alumina refractory particles to be simultaneously incorporated, can be spheroidized and added to the monolithic refractory powder mixture, to obtain a refractory mixture of monolithic refractories having excellent flowability comparable to the refractory mixture of monolithic refractories having spheroidized alumina cement particles incorporated.

Still another preferred monolithic refractory powder mixture of the present invention contains sodium hexametaphosphate as a dispersant. Its content is at least 0.01 wt % and. at most 0.3 wt %. As opposed to liquid dispersant which has to be mixed at the application site, sodium hexametaphosphate is a powder which may be incorporated to the powder mixture beforehand and thus is a dispersant suitable for a monolithic refractory powder mixture. Thus, it provides a merit such that a step of blending a dispersant at the application site can be eliminated.

Further, sodium hexametaphosphate provides an effect of increasing the absolute value of minus δ-potential when the particles of the powder mixture were dispersed in water, with such a small amount as at least 0.01 wt %. As compared with a case where other dispersants are used, the flowability of the powder mixture having water mixed thereto is remarkably good. However, even if sodium hexametaphosphate is added beyond 0.3 wt %, no further improvement in the flowability will be obtained.

The monolithic refractory powder mixture of the present invention contains, in addition to the spheroidized refractory particles and non-spheroidized refractory particles, graded refractory aggregates usually having a particle size of at most 25 mm as the main constituents. Such refractory aggregates include, metal oxides such as magnesia, chromia, boromite, spinel, alumina, mullite, zircon, silica rock, chamotte, pyrophyllite, aluminous shale and bauxite; metal carbides such as silicon carbide; metal nitrides such as silicon nitride; and metal borides such as zirconium boride. These aggregates may be used alone or in combination as a mixture of two or more different types.

It is advised to choose refractory aggregates which are dense with a low porosity, so that the bulk density of the cast refractory product will be high. There are a variety of refractory aggregates having various bulk densities. When a refractory aggregate having a low bulk density is used, the bulk occupied by such a refractory aggregate increases correspondingly, and the amount of water required to impart the self-flowability will correspondingly increase. Further, when the bulk density of the refractory aggregates is low, segregation as between the refractory aggregates and the refractory particles having a mean particle size of at most 30 μm is likely to occur, but such a tendency is suppressed by the incorporation of the spheroidized refractory particles and by reducing the amount of water incorporated.

Another preferred monolithic powder mixture of the present invention contains from 1 to 9 wt % of fumed silica or spheroidized amorphous silica particles. Fumed silica is fine amorphous silica particles obtained by precipitation from vapor phase and is known to be effective for improving the flowability of monolithic refractories. Also in the monolithic refractory powder mixture of the present invention, fumed silica is effective for improving the flowability of the refractory mixture when incorporated in an amount of at least 1 wt %.

However, if it is incorporated to the powder mixture in an amount exceeding 9 wt %, the service life tends to be short although it depends also on the applied use. Further, when spheroidized amorphous silica particles are incorporated instead of fumed silica, it is likewise possible to obtain the effect of improving the flowability of the monolithic refractories.

Another preferred monolithic refractory powder mixture of the present invention contains spheroidized refractory particles obtained by subjecting refractory particles to mechanical impact treatment in a high speed air stream. The spheroidizing treating method comprising the mechanical impact treatment in a high speed air stream is preferred in that spheroidized refractory particles can be obtained simply at a relatively low level of energy consumption. Further, by this method, it is possible to activate the surface of the refractory particles to improve the hydrophilic nature, whereby the flowability of monolithic refractories will be improved without necessity of attaching hydrophilic fine particles to the surface of the refractory particles.

As another spheroidizing treatment method, a flame spraying method may be employed wherein a flame such as an oxygen acetylene flame, or a gas plasma, is used. By such a flame spraying method, it is possible to obtain refractory particles close to spherical particles, which can be effectively used as spheroidized refractory particles for the monolithic refractory powder mixture of the present invention.

Now, the monolithic refractory powder mixture of the present invention will be described in further detail with reference to Examples. However, it should be understood that the present invention is by no means restricted by such specific Examples.

Figure 2:
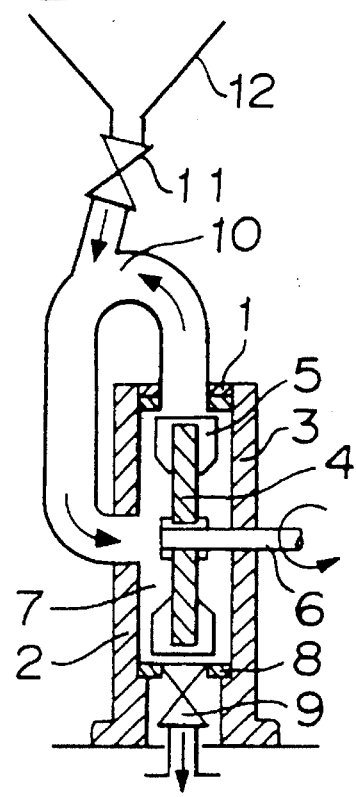
FIG. 2 is a cross-sectional side view of FIG. 1.

For spheroidizing treatment of refractory particles, a mechanical impact treatment apparatus (NHS-3 model) manufactured by Nara Kikai K. K. was used. This apparatus has a structure which is illustrated by the cross-sectional front view in FIG. 1 and by the cross-sectional side view in FIG. 2. In these Figures, reference numeral 1 indicates a casing, 2 a front wall, 3 a rear wall, 4 a rotary disk, 5 a blade, 6 a rotary shaft, 7 an impact chamber, 8 an impact wall, 9 an outlet valve for powder, 10 a circulating duct for powder, 11 an inlet valve for powder, and 12 a hopper.

With this mechanical impact treatment apparatus, the raw material powder put into the hopper 12 is introduced into the impact chamber 7 composed of a disk-like space by opening the inlet valve 11 for the raw material. In the impact chamber 7, there are the rotary disk 4 secured to the rotary shaft 6 which is driven by an electric motor not shown and blades 5 secured to the rotary disk 4. The rotary disk 4 and the rotary blades 5 will be rotated at a high speed, and the rotational energy of the blades 5 is converted partly to a high speed air stream energy in the impact chamber 7, whereby an air stream carrying the powder particles is circulated through the closed flow path of the powder circulating duct 10 attached to the impact chamber 7 in the direction indicated by arrows.

The refractory particles circulated in the mechanical impact treatment apparatus will collide with one another and are repeatedly subjected to mechanical actions such as an impact force, a compression force, a frictional force and a shear force, by blades 5 rotated at a high speed, whereby sharp angles of the refractory particles will be rounded off and fine particles will attach to the surface of the refractory particles, and thus the refractory particles will be spheroidized.

By such spheroidizing treatment, the refractory particles will be formed into spherical or spheroidal particles having no sharp angles and having a small aspect ratio (ratio of the major dimension to the minor dimension). The refractory particles spheroidized by this treatment are rounded particles having no sharp angles which usually have an aspect ratio of at most 3.

The rotation speed of the blades of the mechanical impact treatment apparatus is adjusted at a level where the refractory particles will not excessively be crushed. After the impact treatment for a predetermined period of time, the spheroidized refractory particles will be withdrawn by opening the powder outlet valve 9.

TEST EXAMPLE

As raw materials for refractory particles, alumina cement having an $Al_2O_3$ content of 74 wt % and a CaO content of 24 wt % and having particles sizes within a range of from 0.3 to 176 μm and a mean particle size of 5.5 μm, Bayer alumina powder having a mean particle size of 4.3 μm and an $Al_2O_3$ purity of 99.6 wt %, synthetic mullite powder having $Al_2O_3$ and $SiO_2$ contents of 71 wt % and 27 wt % and a mean particle size of 12 μm, and silicon carbide having a SiC content of 99 wt % and a mean particle size of 2 μm, were used.

Further, as fine particles to be attached on the surface of alumina cement particles, fine particles of sodium hexametaphosphate and fumed silica having a $SiO_2$ purity of 98 wt % and a mean particle size of about 0.9 μm, were used.

Powder mixtures having blend ratios as identified in Table 1 were prepared, and 2 kg of each of such mixtures was introduced into the above described mechanical impact treatment apparatus, and spheroidizing treatment was carried out, to obtain six types of spheroidized refractory particles $A_1$, $A_2$, $A_3$, B, C and D, as shown in Table 1.

The spheroidizing treatment was carried out with the peripheral speed of the rotary disk 4 being about 120 m/sec, so that refractory particles would not be excessively crushed and adequate fixing strength of the fine particles would be obtained. The time for the mechanical impact treatment was set to be 10 minutes so that effective treating effects would be obtained in a relatively short period of time. Further, the particle sizes and the mean particle sizes of powders including the small particles were measured by a particle size distribution analyzer by laser diffraction (7 FRA model manufactured by Microtrac Co.) except for those classified by sieving.

TABLE 1

| Spheroidized refractory particles | $A_1$ | $A_2$ | $A_3$ | B | C | D |
|---|---|---|---|---|---|---|
| Alumina cement (wt %) | 100 | 90 | 90 | — | — | — |
| Bayer alumina powder | — | — | — | 100 | — | — |
| Synthetic mullite powder | — | — | — | — | 100 | — |
| Silicon carbide powder | — | — | — | — | — | 100 |
| Fumed silica | — | 10 | 9 | — | — | — |
| Sodium hexametaphosphate | — | — | 1 | — | — | — |

The obtained spheroidized refractory particles were incorporated in the proportions as identified in Tables 2 and 3 to obtain monolithic refractory powder mixtures (Nos. 1 to 14). Namely, monolithic refractory power mixtures were prepared by using refractory aggregates of bauxite containing 88 wt % of $Al_2O_3$ classified into coarse particels (particle sizes of from 1.68 to 6 mm), intermediate particles (particles sizes of from 0.1 to 1.68 mm) and small particles (obtained by crusing the intermediate particles to particle sizes of at most 0.2 mm), refractory aggregates of fused alumina havin an $Al_2O_3$ content of 98 wt % and classified into the coarse particles (1.0 to 6 mm), intermediate particles (44 μm to 1.0 mm) and small particles (at most 43 μm), refractory aggregates of silicon carbide having a SiC content of 99 wt % and classified into coarse particles (1.0 to 5 mm), intermediate particles (0.2 to 1.0 mm) and small particles (at most 0.2 mm). Other than spheroidized refractory particles and refractory aggregates, calcined alumina powder (particle sizes of at most 43 μm) having an $Al_2O_3$ content of 99.5 wt %, Bayer alumina powder (mean particle size of 4.3 μm) having an $Al_2O_3$ content of 99.6 wt %, synthetic mullite powder (particle sizes of at most 43 μm) having $Al_2O_3$ and $SiO_2$ contents of 71 wt % and 27 wt %, fumed silica (a $SiO_2$ content of 98 wt %, a mean particle size of 0.9 μm) and sodium hexametaphosphate are incorporated in these powder mixtures.

Then, water was added to each powder mixtures, followed by kneading, and the flowability of each monolithic refractory mixture was evaluated by a cone flow value obtained by a slightly modified version of the method stipulated in JIS R-5201. Namely, a predetermined amount of water was added to each of the powder mixtures as shown in Tables 2 and 3, and each mixture was kneaded for three minutes in a planetary mixer. The kneaded refractory mixture was cast into a flow cone mold of a truncated cone shape of 70 mmø–100 mmø×60 mm, and the flow cone mold was withdrawn upwardly, and the refractory mixture was left to stand for 60 seconds without exerting vibration, whereupon the maximum spread dimension of the refractory mixture spread generally in a circular shape and a spread dimension in the perpendicular direction thereto were measured, and the mean value of the two dimensions was calculated and taken as a cone flow value.

The self-flowability was determined by casting a refractory mixture prepared in the same manner as the refractory mixture used for the measurement of the cone flow value, into a mold having an internal dimension of 230 mm×230 mm×230 mm within one minute after kneading and visually observing whether or not the surface of the cast refractory mixture became horizontal, and whether or not air bubbles present in the interior of the refractory mixture would surface and would be discharged from the surface. Pumping transferability was determined by examining whether or not pumping of the kneaded refractory mixture for a distance of 30 m in the horizontal direction and 10 m in the vertical direction was possible, by preparing about 200 kg of a refractory mixture and using a transfer pump using a compressed air of 5 kg/cm$^2$ as a driving source (MIXOKERT, manufactured by Putzmeister Co.).

The porosity and the bulk density were determined by casting the same kneaded refractory mixture as used for the measurement of the cone flow value, into a mold having an internal dimension of 40 mm×40 mm×80 mm, leaving it in a room of 20° C. for 24 hours, and then removing the mold and measuring the porosity and the bulk density with respect to a test specimen dried at 150° C. for 24 hours in accordance with the method stipulated in JIS R-2205.

Powder mixture Nos. 11 to 14 of Comparative Examples, had no self-flowability, whereby the operation by pumping was impossible, and no satisfactory cast products were obtained simply by casting. Therefore, the porosity and the bulk density were measured with respect to cast products prepared by conventional casting under vibration.

Measurement of the compression strength was carried out with respect to the test specimen dried after the measurement of the porosity and the bulk density. A metal block of 40 mm×40 mm×40 mm was pressed to exert a compression load against the center portion of the side surface having an angle with a length of 80 mm, and the maximum compression load at the breakage was obtained and taken as the compression strength (kg/cm$^2$). These evaluation results are also shown in Tables 2 and 3. Among the powder mixtures shown in Tables 2 and 3, Nos. 1 to 10 represent Examples of the present invention, and Nos. 11 to 14 represent Comparative Examples.

From the above test results, it is evident that the flowability of the refractory mixture having the monolithic refractory powder mixture kneaded by adding water, was remarkably good with powder mixtures containing from 2 to 30 wt % of spheroidized refractory particles or refractory particles spheroidized and having fine particles of e.g. silica attached on the surface. Further, good flowability is secured with a refractory mixture of the monolithic refractory powder mixture of the present invention kneaded by adding a relatively small amount of water, whereby packing of the particles in the cast product is excellent, and the bulk density of the cast product influential over the service life of the monolithic refractories, is high.

Further, with the monolithic refractory powder mixture of the present invention, a refractory mixture of monolithic refractories kneaded by adding water in an amount of 6 parts by weight or more per 100 parts by weight of the powder mixture, shows excellent flowability, and pumping can be employed for its application, and the refractory mixture cast into a mold will fully fill the corners in the mold and the surface of the refractory mixture becomes horizontal without exerting vibration, and air bubbles in the interior of the refractory mixture will naturally surface and will be discharged.

The bulk density and other physical properties of the cast product obtainable by casting the refractory mixture of the monolithic refractory powder mixture of the present invention, are comparable or superior to conventional monolithic refractories prepared by exerting vibration, and it is possible to obtain a cast product of monolithic refractories having excellent cost performance.

At the same time, the application of the monolithic refractory mixture by pumping can save man power, and the work can be completed in a short period of time. Promotion of man power saving is essential for the development and continuity of the industry, and the industrial value of the present invention is substantial.

TABLE 2

| | Powder mixture No. | | | | | | |
|---|---|---|---|---|---|---|---|
| | 1 | 2 | 3 | 4 | 5 | 6 | 7 |
| Buaxite (Coarse particles) (wt %) | 40 | 40 | 40 | 40 | 40 | 40 | 40 |
| Buaxite (Intermediate particles) | 22 | 22 | 22 | 22 | 22 | 22 | 22 |
| Buaxite (Small particles) | 13 | 13 | 13 | 13 | 13 | 7 | 12 |
| Calcined alumina powder | 10 | 10 | 10 | 10 | 10 | — | 10 |
| Spheroidized particles ($A_1$–$A_3$) | $A_1$:5 | $A_2$:5 | $A_3$:5 | — | $A_1$:2.5 | $A_1$:5 | — |
| Spheroidized particles (B, C) | — | — | — | B:4 | — | B:20 | C:4 |
| Alumina cement | — | — | — | 5 | — | — | 5 |
| Bayer alumina powder | 4.0 | 4.0 | 4.0 | — | 6.5 | — | 2.0 |
| Fumed silica | 5.95 | 5.95 | 5.95 | 5.95 | 5.95 | 5.95 | 4.95 |
| Sodium hexametaphosphate | 0.05 | 0.05 | 0.05 | 0.05 | 0.05 | 0.05 | 0.05 |
| Water (parts by weight per 100 parts) | 6.0 | 6.0 | 6.0 | 6.0 | 6.0 | 6.0 | 6.0 |
| Cone flow value (mm) | 200 | 212 | 210 | 204 | 195 | 240 | 210 |
| Pumping transferability | Yes | Yes | Yes | Yes | Yes | Yes | Yes |
| Self-flowability | Yes | Yes | Yes | Yes | Yes | Yes | Yes |
| Apparent porosity (%) | 13.2 | 13.0 | 12.1 | 12.6 | 1.31 | 13.5 | 14.2 |
| Bulk density | 3.00 | 3.01 | 2.97 | 2.97 | 3.00 | 2.96 | 2.96 |
| Compression strength (kg/cm$_2$) | 1014 | 1333 | 1020 | 1012 | 620 | 920 | 720 |

TABLE 3

| | Powder mixture No. | | | | | | |
|---|---|---|---|---|---|---|---|
| | 8 | 9 | 10 | 11 | 12 | 13 | 14 |
| Buaxite (Coarse particles) (wt %) | 38 | — | — | 40 | 40 | 40 | — |
| Buaxite (Intermediate particles) | 22 | — | — | 22 | 22 | 22 | — |
| Buaxite (Small particles) | 12 | — | — | 13 | 13 | 12 | — |
| Fused alumina (Coarse particles) | — | 46 | — | — | — | — | 46 |
| Fused alumina | — | 26 | — | — | — | — | 26 |

TABLE 3-continued

| | Powder mixture No. | | | | | | |
|---|---|---|---|---|---|---|---|
| | 8 | 9 | 10 | 11 | 12 | 13 | 14 |
| (Intermediate particles) | | | | | | | |
| Fused alumina (Small particles) | — | 12 | — | — | — | — | 12 |
| Silicon carbide (Coarse particles) | — | — | 32 | — | — | — | — |
| Silicon carbide (Intermediate particles) | — | — | 30 | — | — | — | — |
| Silicon carbide (Small particles) | — | — | 18 | — | — | — | — |
| Calcined alumina powder | 10 | — | — | 10 | 10 | 10 | — |
| Bayer alumina powder | 4 | — | 5 | 4 | 4 | 2 | 5 |
| Synthetic mullite powder | — | — | — | — | — | 4 | — |
| Spheroidized particles (B, D) | D:4 | B:5 | D:4 | — | — | — | — |
| High alumina cement | 5 | 5 | 5 | [001f]5 | 5 | 5 | 5 |
| Fumed silica | 4.95 | 5.95 | 5.95 | 5.95 | 5.95 | 4.95 | 5.95 |
| Sodium hexametaphosphate | 0.05 | 0.05 | 0.05 | 0.05 | 0.05 | 0.05 | 0.05 |
| Water (parts by weight per 100 parts) | 6.0 | 4.0 | 6.0 | 6.0 | 7.0 | 7.0 | 4.2 |
| Cone flow value (mm) | 203 | 220 | 220 | 105 | 152 | 110 | 120 |
| Pumping transferability | Yes | Yes | Yes | No | No | No | No |
| Self-flowability | Yes | Yes | Yes | No | No | No | No |
| Apparent porosity (%) | 13.9 | 6.0 | 15.0 | 13.9 | 22.0 | 18.0 | 6.2 |
| Bulk density | 2.97 | 3.25 | 2.64 | 2.95 | 2.90 | 2.89 | 3.21 |
| Compression strength (kg/cm$^2$) | 750 | 1175 | 705 | 1007 | 420 | 300 | 1021 |

What is claimed is:

1. A monolithic refractory powder mixture containing a refractory aggregate and from 2 to 30 wt % of spheroidized refractory particles having a mean particle size of 1 μm to 30 μm of at least one member selected from the group consisting of alumina cement, alumina, titania, bauxite, diaspore, mullite, aluminous shale, chamotte, pyrophillite, sillimanite, andrewsite, silica rock, chromite, spinel, magnesia, zirconia, zircon, chromia, silicon nitride, aluminum nitride, silicon carbide, boron carbide, zirconium boride and titanium boride, said spheroidized refractory particles are those spheroidized by mechanical impact treatment in a high speed air stream, and having a cone flow value of at least 180 mm when a refractory mixture having the powder mixture kneaded by an addition of 6 parts by weight of water per 100 parts by weight of the powder mixture, is cast into a cone-shaped mold with a dimension of 70 mmø–100 mmø× 60 mm and left to stand for 60 seconds without exerting vibration after removing the cone-shaped mold.

2. The monolithic refractory powder mixture according to claim 1, which contains from 0.5 to 10 wt % of spheroidized alumina cement particles having a mean particle size of at most 30 μm.

3. The monolithic refractory powder mixture according to claim 1, wherein fine particles of at least one member selected from the group consisting of metal oxides, metal nitrides, metal carbides and metal borides having a mean particle size of at most 50% of the mean particle size of the refractory particles and made of a material different from the refractory particles, are attached to the surface of the spheroidized refractory particles.

4. The monolithic refractory powder mixture according to claim 1, which further contains at most 0.3 wt % of sodium hexametaphosphate as a dispersant.

5. The monolithic refractory powder mixture according to claim 1, which further contains from 1 to 9 wt % of fumed silica or spheroidized amorphous silica particles.

6. A monolithic refractory powder mixture containing a refractory aggregate, from 0.5 to 10 wt % of spheroidized alumina cement particles having a mean particle size of at most 30 μm and from 2 to 30 wt % of spheroidized refractory particles having a mean particle size of 1 μm to 30 μm of at least one member selected from the group consisting of alumina cement, alumina, titania, bauxite, diaspore, mullire, aluminous shale, chamotte, pyrophillite, sillimanite, andrewsite, silica rock, chromite, spinel, magnesia, zirconia, zircon, chromia, silicon nitride, aluminum nitride, silicon carbide, boron carbide, zirconium boride and titanium boride, and having a cone flow value of at least 180 mm when a refractory mixture having the powder mixture kneaded by a addition of 6 parts by weight of water per 100 parts by weight of the powder mixture, is cast into a cone-shaped mold with a dimension of 70 mmø–100 mmø× 60 mm and left to stand for 60 seconds without exerting vibration after removing the cone-shaped mold.

7. The monolithic refractory powder mixture according to claim 6, wherein fine particles of at least one member selected from the group consisting of metal oxides, metal nitrides, metal carbides and metal borides having a mean particle size of at most 50% of the mean particle size of the refractory particles and made of a material different from the refractory particles, are attached to the surface of the spheroidized refractory particles.

8. The monolithic refractory powder mixture according to claim 6, which contains at most 0.3 wt % of sodium hexametaphosphate as a dispersant.

9. The monolithic refractory powder mixture according to claim 6, which further contains from 1 to 9 wt % of fumed silica or spheroidized amorphous silica particles.

10. The monolithic refractory powder mixture according to claim 6, wherein the refractory particles are those spheroidized by mechanical impact treatment in a high speed air stream.

11. The monolithic refractory powder mixture according to claim 6, wherein the refractory particles are those spheroidized by flame or plasma spraying.

* * * * *